US011497101B2

(12) United States Patent
Kim

(10) Patent No.: US 11,497,101 B2
(45) Date of Patent: Nov. 8, 2022

(54) PRIORITY CONTROL CIRCUIT FOR OPERATION OF VEHICLE LAMPS

(71) Applicant: HYUNDAI MOBIS CO., LTD., Seoul (KR)

(72) Inventor: Mi Seon Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 286 days.

(21) Appl. No.: 16/937,830

(22) Filed: Jul. 24, 2020

(65) Prior Publication Data

US 2021/0029805 A1 Jan. 28, 2021

(30) Foreign Application Priority Data

Jul. 26, 2019 (KR) ........................ 10-2019-0090781

(51) Int. Cl.

*B60Q 1/00* (2006.01)
*B60Q 1/30* (2006.01)
*B60Q 1/34* (2006.01)
*H05B 47/14* (2020.01)
*H05B 47/155* (2020.01)
*F21S 41/663* (2018.01)

(52) U.S. Cl.

CPC .......... *H05B 47/155* (2020.01); *F21S 41/663* (2018.01); *H05B 47/14* (2020.01)

(58) Field of Classification Search

None

See application file for complete search history.

(56) References Cited

FOREIGN PATENT DOCUMENTS

KR 10-2016-0024302 3/2016

*Primary Examiner* — Dedei K Hammond

(74) *Attorney, Agent, or Firm* — H.C. Park & Associates, PLC

(57) ABSTRACT

A priority control circuit for the operation of vehicle lamps. The priority control circuit includes a first circuit and a second circuit. The first circuit includes a first PNP transistor, a first NPN transistor having a gate connected to a collector of the first PNP transistor, and a first output port connected to a collector of the first NPN transistor. When a first lamp turn-on signal for turning on a first lamp is input, the first circuit turns on a second lamp and a third lamp. The second circuit includes a second NPN transistor, a second PNP transistor having a gate connected to a collector of the second NPN transistor, and a second output port connected to a collector of the second PNP transistor. The second circuit controls priorities for the operation of the second lamp and the third lamp.

11 Claims, 4 Drawing Sheets

PRIORITY CONTROL CIRCUIT FOR OPERATION OF VEHICLE LAMPS

CROSS-REFERENCE TO RELATED APPLICATION

This application claims priority from and the benefit of Korean Patent Application No. 10-2019-0090781, filed on Jul. 26, 2019, which is hereby incorporated by reference for all purposes as if set forth herein.

BACKGROUND

Field

Exemplary embodiments of the present disclosure relate to a priority control circuit for the operation of vehicle lamps, and more particularly, to a priority control circuit for the operation of daytime running lamps and tail lamps of a vehicle.

Discussion of the Background

A vehicle is provided with several types of lamps for safety which are located on the outside thereof and used for different purposes. For example, a vehicle is provided with headlamps, turn signal lamps, daytime running lamps, tail lamps, and the like. In general, the specifications, lighting conditions, and the like of the respective lamps are defined by laws.

With the development of the technology of electric/electronic components, lamp devices, and the like of vehicles and the diversification of vehicle designs, turn signal lamps, daytime running lamps, tail lamps, and the like are applied to the same light-emitting surface or use the same light source in more cases.

In such cases, at least two among turn signal lamps, daytime running lamps, and tail lamps are generally driven by a single driver.

Here, when turn-on commands for turn signal lamps, daytime running lamps, and tail lamps are simultaneously generated, a control signal regarding which lamp is to be turned on or off needs to be provided to the driver in order to meet relevant laws and regulations or provide optimal lamp operations.

In the related art, a separate processor, such as a micro-control unit (MCU), is provided for such priority control. The processor determines priorities and provides a control signal for the operation of lamps to the driver.

A background art of the present disclosure is disclosed in Korean Patent Application Laid-Open No. 10-2016-0024302 (Mar. 4, 2016).

SUMMARY

However, the use of a processor may require a micro-control unit (MCU) or a regulator for the supply of power to the MCU, a pull-down resistor for detecting a disconnection of a control signal, or the like, thereby increasing costs.

Various embodiments are directed to a control circuit capable of controlling the priority for the operation of lamps using an analog circuit in order to overcome the above-described problems of the priority control method in the related art.

In an embodiment, a priority control circuit for the operation of vehicle lamps may include: a first switching element turned on in response to a first lamp turn-on signal for turning on a first lamp and a second lamp turn-on signal for turning on a second lamp; a second switching element turned on in response to the first lamp turn-on signal and a third lamp turn-on signal for turning on a third lamp; a third switching element turned on in response to the second lamp turn-on signal; a fourth switching element and a fifth switching element respectively turned on when the second switching element is turned on; a sixth switching element turned on when the third switching element is turned on and turned off when the fifth switching element is turned on; a seventh switching element turned on when the first switching element is turned on and turned off when the fourth switching element is turned on; and an output port connected to the sixth switching element and the seventh switching element. The output port may have at least three states according to whether the sixth switching element and the seventh switching element are turned on or off.

The output port may have a ground state irrespective of a state of the sixth switching element when the seventh switching element is turned on, have a high state when the sixth switching element is turned on and the seventh switching element is turned off, and have an open state when the sixth switching element and the seventh switching element are turned off.

The sixth switching element may be a PNP transistor having an emitter connected to a regulator and a collector connected to the output port through a resistor, and the seventh switching element may be an NPN transistor having a collector connected to the output port and an emitter connected to a ground.

The first switching element may be a PNP transistor having an emitter connected to a second lamp turn-on signal input port, a gate connected to a first lamp turn-on signal input port, and a collector connected to the seventh switching element. The second switching element may be a PNP transistor having an emitter connected to a third lamp turn-on signal input port, a gate connected to the first lamp turn-on signal input port, and a collector connected to the fourth switching element and the fifth switching element. The third switching element may be an NPN transistor having a collector connected to the sixth switching element, a gate connected to the second lamp turn-on signal input port, and an emitter connected to the ground.

The fourth switching element may be an NPN transistor having a collector connected to the seventh switching element, a gate connected to the collector of the second switching element, and an emitter connected to the ground. The fifth switching element may be an NPN transistor having a collector connected to the gate of the third switching element, a gate connected to the collector of the second switching element, and an emitter connected to the ground.

The output port may output signals to control the second lamp and the third lamp to be turned on.

In another embodiment, a priority control circuit for the operation of vehicle lamps may include: a first circuit including a first PNP transistor, a first NPN transistor having a gate connected to a collector of the first PNP transistor, and a first output port connected to a collector of the first NPN transistor, and configured to turn on, when a first lamp turn-on signal for turning on a first lamp is input, a second lamp and a third lamp; and a second circuit including a second NPN transistor, a second PNP transistor having a gate connected to a collector of the second NPN transistor, and a second output port connected to a collector of the second PNP transistor, and configured to control the priorities for the operation of the second lamp and the third lamp.

The first PNP transistor may have a gate connected to a first lamp turn-on signal input port and an emitter connected to a regulator. The first NPN transistor may have an emitter connected to the ground.

The second NPN transistor may have a gate connected to a second lamp turn-on signal input port and an emitter connected to the ground. The second PNP transistor may have an emitter connected to a regulator.

The first lamp may be a turn signal lamp, the second lamp may be a daytime running lamp, and the third lamp may be a tail lamp.

The priority control circuit for the operation of vehicle lamps according to the present disclosure may reduce material costs and reduce some processes, such as the use of a software program, thereby reducing fabrication costs, compared to the method in which a microprocessor is used.

The priority control circuit for the operation of vehicle lamps according to the present disclosure may control the operation of lamps by circuit operation according to a disconnection of a signal (e.g. a lamp turn-on signal), input from a vehicle, without the need to detect the disconnection of the signal.

The priority control circuit for the operation of vehicle lamps according to the present disclosure may not change a power unit, even in a case in which a turn signal lamp, a daytime running lamp, and a tail lamp need to have different priorities according to the laws and regulations, unlike the method in which the power unit determines the priorities for the operation of the lamps.

DETAILED DESCRIPTION OF THE ILLUSTRATED EMBODIMENTS

Figure 1:
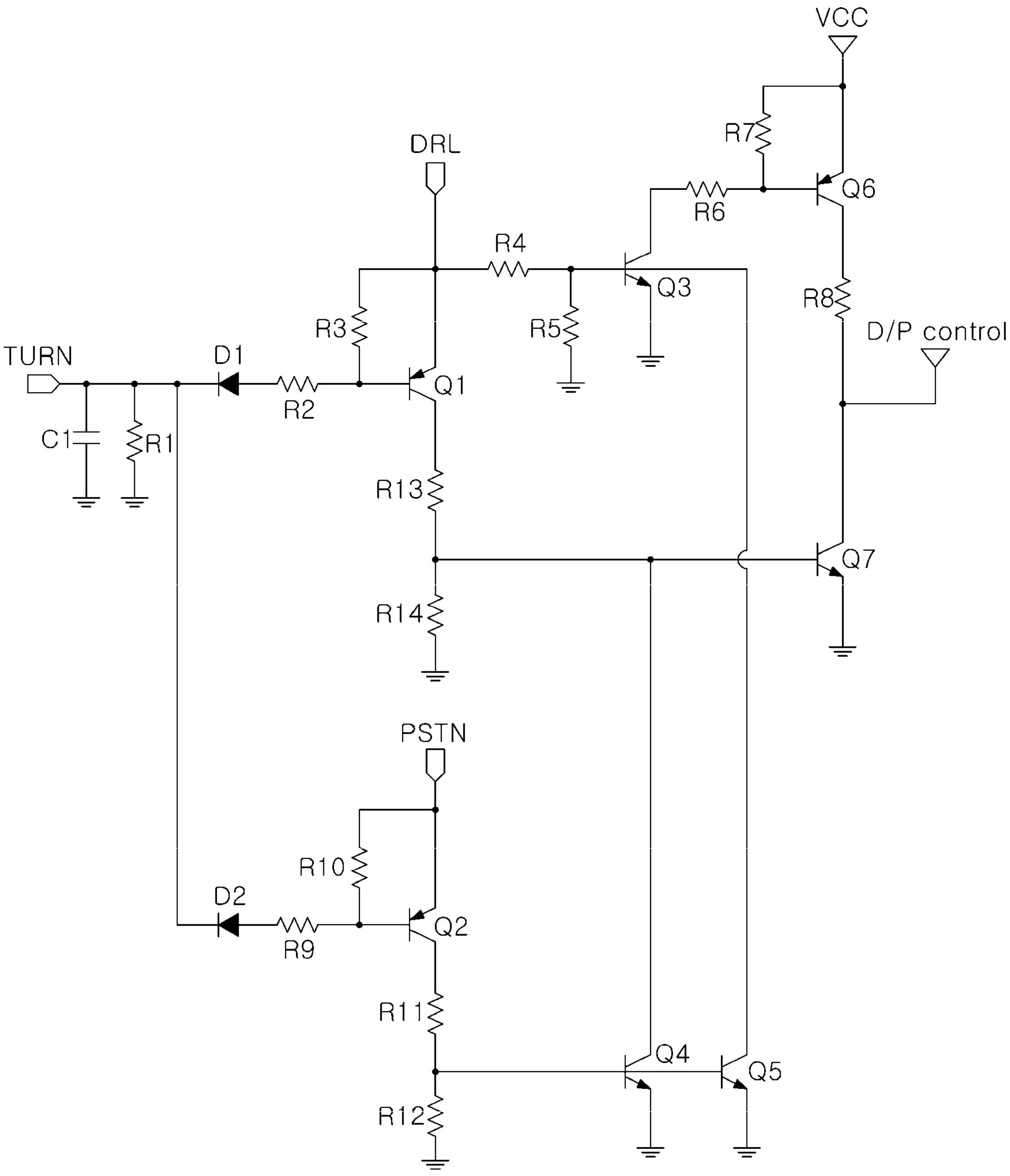
FIG. 1 is an exemplary diagram illustrating a priority control circuit for the operation of vehicle lamps according to an embodiment of the present disclosure.

Hereinafter, a priority control circuit for the operation of vehicle lamps according to the present disclosure will be described with reference to the accompanying drawings through various exemplary embodiments. The thicknesses of lines or the sizes of components illustrated in the drawings may be exaggerated for clarity and convenience of explanation. In addition, the terms used herein are defined in consideration of functions thereof in the present disclosure, but may vary depending on the intentions of users or operators, or practices. Therefore, the terms shall be defined on the basis of the description throughout the specification.

In addition, when it is described that a first component is connected to a second component, it should be interpreted that the first component may be directly connected to the second component as well as that the first component may be connected to the second component via another component.

FIG. 1 is an exemplary diagram illustrating a priority control circuit for the operation of vehicle lamps according to an embodiment of the present disclosure.

As illustrated in FIG. 1, the priority control circuit for the operation of vehicle lamps according to an embodiment of the present disclosure may include three input ports through which turn-on signals for three lamps are input and one output port through which a control signal (i.e. a voltage level/state) is transferred to a lamp driver.

In the present disclosure, the three lamps may be referred to as a first lamp, a second lamp, and a third lamp, respectively, and may be a turn signal lamp, a daytime running lamp, and a tail lamp, respectively, in the present embodiment.

The priority control circuit for the operation of vehicle lamps according to the present embodiment may include a first switching element Q1 turned on in response to a first lamp turn-on signal and a second lamp turn-on signal, a second switching element Q2 turned on in response to the first lamp turn-on signal and a third lamp turn-on signal, a third switching element Q3 turned on in response to the second lamp turn-on signal, a fourth switching element Q4 and a fifth switching element Q5 each turned on when the second switching element Q2 is turned on, a sixth switching element Q6 turned on when the third switching element Q3 is turned on and be turned off when the fifth switching element Q5 is turned on, a seventh switching element Q7 turned on when the first switching element Q1 is turned on and be turned off when the fourth switching element Q4 is turned on regardless of whether the first switching element Q1 is turned on or off, and an output port connected to the sixth switching element Q6 and the seventh switching element Q7.

The output port may have at least three states according to whether the sixth switching element Q6 and the seventh switching element Q7 are turned on or off. For example, the output port may have one state from among a high level, a ground level, and an open level.

The output port is a port through which signals for turn-on control over the second lamp and the third lamp are output. The output port may serve as a control signal input port of the lamp driver. The lamp driver may perform a control operation to turn on the second lamp, turn on the third lamp, or turn off both the second lamp and the third lamp by recognizing the three states.

For example, the output port may have the ground level regardless of the state of the sixth switching element Q6 when the seventh switching element Q7 is turned on, have the high level when the sixth switching element Q6 is turned on and the seventh switching element Q7 is turned off, and have the open level when the sixth switching element Q6 and the seventh switching element Q7 are turned off.

The lamp driver may be configured to perform a control operation to turn off both the second and third lamps when the output port has the ground level, turn on the second lamp when the output port has the high level, and turn on the third level when the output port has the open level.

The first lamp turn-on signal may not be a signal used to actually turn on the first lamp (i.e. the turn signal lamp) but may be a signal for controlling the second lamp and the third lamp to be turned on or off.

In this case, in a case in which the first lamp turn-on signal is not input, when one of the second lamp turn-on signal and the third lamp turn-on signal is input, a control operation of turning on a corresponding lamp is performed. However, when both the second lamp turn-on signal and the third lamp turn-on signal are input, a control operation of turning on the second lamp is performed. Thus, the priorities for the operation of the lamps may be realized by a circuit configuration instead of a separate processor.

In a case in which the first lamp turn-on signal is input, when the second lamp turn-on signal is further input, a control operation of turning off the second lamp and the third lamp is performed. When the third lamp turn-on signal is further input, a control operation of turning on the third lamp is performed. When both the second lamp turn-on signal and the third lamp turn-on signal are further input, a control operation of turning on the third lamp is performed. In this manner, the priorities for the operation of the lamps may be controlled by a circuit configuration.

Hereinafter, an exemplary configuration of the priority control circuit described above will be described in more detail with reference to FIG. 1.

In the present embodiment, the switching elements may be implemented as bipolar junction transistors. The first switching element Q1, the second switching element Q2, and the sixth switching element Q6 may be implemented as PNP transistors, while the remaining switching elements may be implemented as NPN transistors.

A first lamp turn-on signal input port TURN is connected to a gate of the first switching element Q1 through a diode D1 and a resistor R2, and in the same manner, to a gate of the second switching element Q2 through a diode D2 and a resistor R9.

Thus, when the first lamp turn-on signal is not input, i.e. in the open level, none of the first switching element Q1 and the second switching element Q2 operates (i.e. is turned on).

In addition, the first switching element Q1 has an emitter connected to a second lamp turn-on signal input port and a collector connected to a gate of the seventh switching element Q7 through a resistor R13. In addition, the emitter of the first switching element Q1 is connected to a gate thereof through a resistor R3.

Accordingly, when the first lamp turn-on signal is input to the ground and the second lamp turn-on signal is input, the first switching element Q1 operates.

Similarly to the first switching element Q1, the second switching element Q2 has an emitter connected to a third lamp turn-on signal input port PSTN and a collector connected to a gate of the fourth switching element Q4 and a gate of the fifth switching element Q5 through a resistor R11.

That is, when the first lamp turn-on signal is input to the ground and the third lamp turn-on signal is input, the first switching element Q1 operates.

The third switching element Q3 has a collector connected to the sixth switching element Q6 through a resistor R6, a gate connected to a second lamp turn-on signal input port DRL, and an emitter connected to the ground.

The sixth switching element Q6 has an emitter connected to a regulator VCC, a collector connected to an output port through a resistor R8, and a gate connected to the emitter through a resistor R7.

That is, the third switching element Q3 operates when the second lamp turn-on signal is input. When the third switching element Q3 operates, the sixth switching element Q6 also operates.

Meanwhile, the fourth switching element Q4 has a collector connected to the gate of the seventh switching element Q7 and an emitter connected to the ground. Thus, when the first switching element Q1 operates, the seventh switching element Q7 operates. Independently, when the fourth switching element Q4 operates, the seventh switching element Q7 does not operate.

The fifth switching element Q5 has a collector connected to the gate of the third switching element Q3 and an emitter connected to the ground. Thus, when the fifth switching element Q5 operates, the sixth switching element Q6 does not operate.

The seventh switching element Q7 has a collector connected to the output port and an emitter connected to the ground.

That is, in this circuit configuration, in a case in which a turn-on signal for the turn signal lamp is not input, when a turn-on signal for the daytime running lamp and a turn-on signal for the tail lamp are input, none of the first switching element Q1 and the second switching element Q2 operates, but the third switching element Q3 operates, causing the sixth switching element Q6 to operate. Thus, the output port has the high level, such that the daytime running lamp is turned on.

In a case in which the turn-on signal for the turn signal lamp is not input, when the turn-on signal for the daytime running lamp is not input, none of the switching elements operates. Thus, the output port has the open level, such that the tail lamp is turned on.

When only the turn-on signal for the turn signal lamp and the turn-on signal for the daytime running lamp are input, the first switching element Q1 operates, causing the seventh switching element Q7 to operate. Thus, the output port has the ground level, such that the daytime running lamp and the tail lamp are turned off.

When only the turn-on signal for the turn signal lamp and the turn-on signal for the tail lamp are input, the second switching element Q2 operates. Then, the fourth switching element Q4 and the fifth switching element Q5 operate, causing none of the sixth switching element Q6 and the seventh switching element Q7 to operate. Thus, the output port has the open level, such that the tail lamp is turned on.

When only the turn-on signal for the turn signal lamp, the turn-on signal for the daytime running lamp, and the turn-on signal for the tail lamp are input, both the first switching element Q1 and the second switching element Q2 operate. In this case, since the fourth switching element Q4 and the fifth switching element Q5 operate, the output port has the open level, such that the tail lamp is turned on.

Figure 2:
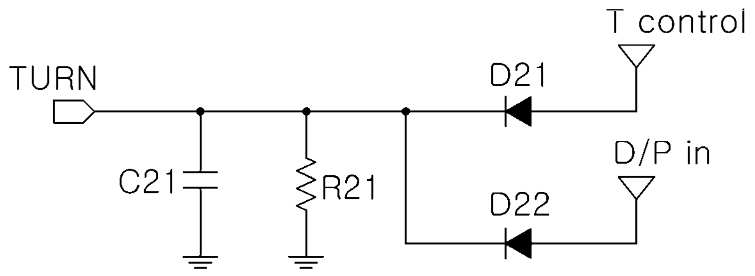
FIGS. 2A to 2C are exemplary diagrams illustrating a priority control circuit for the operation of vehicle lamps according to another embodiment of the present disclosure.
Figure 3:
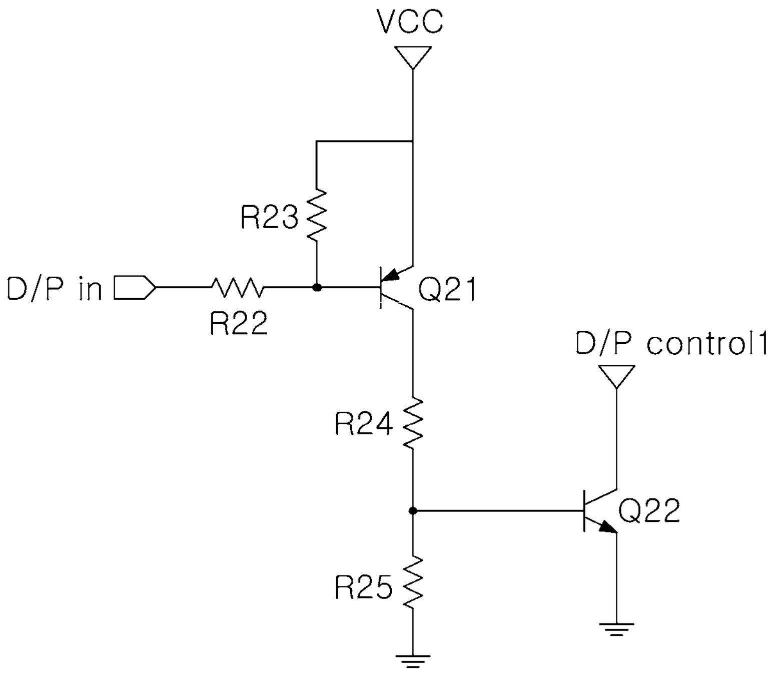
Figure 4:
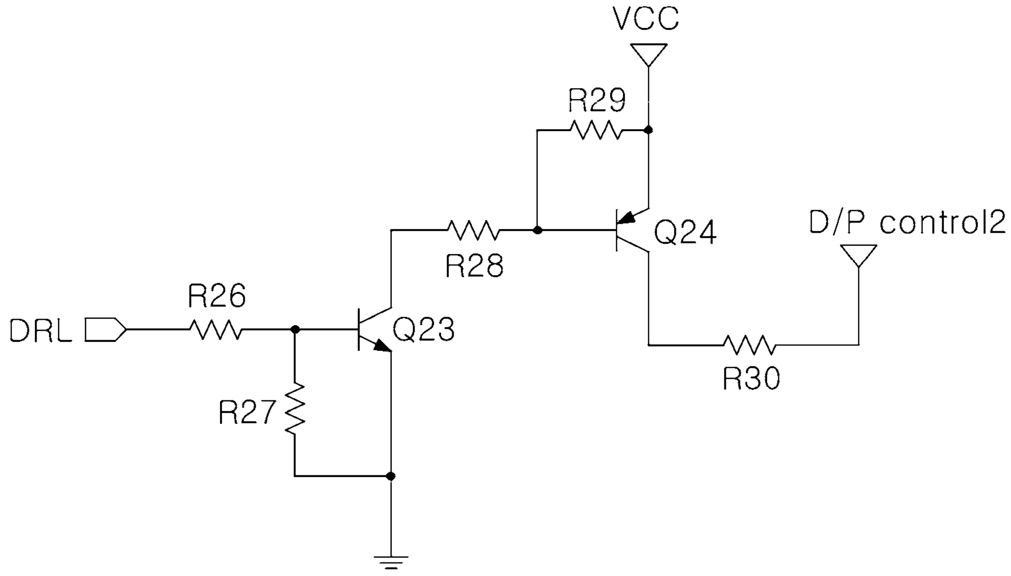

FIGS. 2A to 2C are exemplary diagrams illustrating a priority control circuit for the operation of vehicle lamps according to another embodiment of the present disclosure.

As illustrated in FIG. 2A, the turn-on signal for the turn signal lamp may be divided into a control signal input to the lamp driver so as to actually turn on the turn signal lamp and an input signal input to the priority control circuit for the operation of vehicle lamps according to the present disclosure to determine whether to turn on or off the daytime running lamp and the tail lamp.

That is, the turn signal lamp is frequently configured to be turned on constantly when the turn signal lamp is requested to be turned on. Thus, the priority control circuit for the operation of vehicle lamps according to the present disclosure may be configured to control the priorities for turning on the daytime running lamp and the tail lamp and whether or not to turn on the daytime running lamp and the tail lamp.

That is, as illustrated in FIG. 2B, a first circuit includes a first PNP transistor Q21, a first NPN transistor Q22, and a first output port D/Pcontrol1. When the first lamp turn-on signal is input, the first circuit performs an operation of turning off the second lamp and the third lamp. That is, the first circuit is a circuit for controlling the priority between the first lamp and the second and third lamps.

Specifically, for example, the first PNP transistor Q21 has a gate connected to a first lamp turn-on signal input port D/P in, an emitter connected to a regulator VCC, and a collector connected to a gate of the first NPN transistor Q22 through a resistor R24.

The first NPN transistor Q22 has a collector connected to the first output port D/Pcontrol1 and an emitter connected to the ground.

The first output port D/Pcontrol1 serves as a first input port of the lamp driver. The lamp driver may be configured to allow the daytime running lamp or the tail lamp to operate when the first output port D/Pcontrol1 has the high level and to allow the daytime running lamp and the tail lamp to be turned off when the first output port D/Pcontrol1 has the ground level.

Accordingly, when the turn-on signal for the turn signal lamp is input to the ground, the first PNP transistor Q21 operates, causing the first NPN transistor Q22 to operate. Thus, the first output port D/Pcontrol1 is grounded, such that the daytime running lamp and the tail lamp are controlled to be turned off.

In addition, as illustrated in FIG. 2C, a second circuit includes a second NPN transistor Q23, a second PNP transistor Q24, and a second output port D/Pcontrol2. The second circuit may control the priority between the second lamp and the third lamp, i.e. the daytime running lamp and the tail lamp.

Specifically, for example, the second NPN transistor Q23 has a gate connected to the second lamp turn-on signal input port, an emitter connected to the ground, and a collector connected to a gate of the second PNP transistor Q24.

The second PNP transistor Q24 has a collector connected to the second output port D/Pcontrol2 and an emitter connected to the regulator VCC.

The second output port D/Pcontrol2 serves as a second input port of the lamp driver. The lamp driver may be configured to allow the tail lamp to be turned on when the second output port D/Pcontrol2 has the open level and to allow the daytime running lamp to be turned on when the second output port D/Pcontrol2 has the high level.

Accordingly, when the turn-on signal for the daytime running lamp is input, the second NPN transistor Q23 operates, causing the second PNP transistor Q24 to operate. Thus, the second output port D/Pcontrol2 has the high level, such that the daytime running lamp is controlled to be turned on.

In contrast, since none of the transistors operates when the turn-on signal for the daytime running lamp is not input, the second output port D/Pcontrol2 has the open level, such that the tail lamp is controlled to be turned on.

As set forth above, the priority control circuit according to the present embodiment may control the priorities for turning on the lamps by the circuit configurations.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A priority control circuit for operation of vehicle lamps, the priority control circuit comprising:
- a first switching element turned on in response to a first lamp turn-on signal for turning on a first lamp and a second lamp turn-on signal for turning on a second lamp;
- a second switching element turned on in response to the first lamp turn-on signal and a third lamp turn-on signal for turning on a third lamp;
- a third switching element turned on in response to the second lamp turn-on signal;
- a fourth switching element and a fifth switching element respectively turned on when the second switching element is turned on;
- a sixth switching element turned on when the third switching element is turned on and turned off when the fifth switching element is turned on;
- a seventh switching element turned on when the first switching element is turned on and turned off when the fourth switching element is turned on; and
- an output port connected to the sixth switching element and the seventh switching element,
- wherein the output port has at least three states according to whether the sixth switching element and the seventh switching element are turned on or off.

2. The priority control circuit according to claim 1, wherein the output port has a ground state, irrespective of a state of the sixth switching element, when the seventh switching element is turned on, has a high state when the sixth switching element is turned on and the seventh switching element is turned off, and has an open state when the sixth switching element and the seventh switching element are turned off.

3. The priority control circuit according to claim 2, wherein the sixth switching element is a PNP transistor having an emitter connected to a regulator and a collector connected to the output port through a resistor, and
- the seventh switching element is an NPN transistor having a collector connected to the output port and an emitter connected to the ground.

4. The priority control circuit according to claim 1, wherein the first switching element is a PNP transistor having an emitter connected to a second lamp turn-on signal input port, a gate connected to a first lamp turn-on signal input port, and a collector connected to the seventh switching element,
- the second switching element is a PNP transistor having an emitter connected to a third lamp turn-on signal input port, a gate connected to the first lamp turn-on signal input port, and a collector connected to the fourth switching element and the fifth switching element, and
- the third switching element is an NPN transistor having a collector connected to the sixth switching element, a gate connected to the second lamp turn-on signal input port, and an emitter connected to a ground.

5. The priority control circuit according to claim 4, wherein the fourth switching element is an NPN transistor having a collector connected to the seventh switching element, a gate connected to the collector of the second switching element, and an emitter connected to the ground, and
- the fifth switching element is an NPN transistor having a collector connected to the gate of the third switching element, a gate connected to the collector of the second switching element, and an emitter connected to the ground.

6. The priority control circuit according to claim 1, wherein the output port outputs signals to control the second lamp and the third lamp to be turned on.

7. The priority control circuit according to claim 1, wherein the first lamp is a turn signal lamp, the second lamp is a daytime running lamp, and the third lamp is a tail lamp.

8. A priority control circuit for operation of vehicle lamps, the priority control circuit comprising:
- a first circuit including a first PNP transistor, a first NPN transistor having a gate connected to a collector of the first PNP transistor, and a first output port connected to a collector of the first NPN transistor, and configured to turn on, when a first lamp turn-on signal for turning on a first lamp is input, a second lamp and a third lamp; and a second circuit including a second NPN transistor, a second PNP transistor having a gate connected to a collector of the second NPN transistor, and a second output port connected to a collector of the second PNP transistor, wherein the second circuit controls priorities for operation of the second lamp and the third lamp.

9. The priority control circuit according to claim 8, wherein the first PNP transistor has a gate connected to a first lamp turn-on signal input port and an emitter connected to a regulator, and the first NPN transistor has an emitter connected to a ground.

10. The priority control circuit according to claim 8, wherein the second NPN transistor has a gate connected to a second lamp turn-on signal input port and an emitter connected to a ground, and the second PNP transistor has an emitter connected to a regulator.

11. The priority control circuit according to claim 8, wherein the first lamp is a turn signal lamp, the second lamp is a daytime running lamp, and the third lamp is a tail lamp.

* * * * *